(12) United States Patent
Leistner et al.

(10) Patent No.: US 7,753,461 B2
(45) Date of Patent: Jul. 13, 2010

(54) REFRIGERATOR SHELVING SYSTEM

(75) Inventors: David W. Leistner, Sidney, OH (US);
John M. Antos, Ann Arbor, MI (US);
James C. Butler, Sidney, OH (US);
John W. Wissinger, Gregory, MI (US)

(73) Assignee: Thetford Corporation, Ann Arbor, MI (US)

( * ) Notice: Subject to any disclaimer, the term of this patent is extended or adjusted under 35 U.S.C. 154(b) by 1166 days.

(21) Appl. No.: 10/493,357

(22) PCT Filed: Oct. 21, 2002

(86) PCT No.: PCT/US02/33553

§ 371 (c)(1),
(2), (4) Date: Nov. 19, 2004

(87) PCT Pub. No.: WO03/036200

PCT Pub. Date: May 1, 2003

(65) Prior Publication Data
US 2005/0082956 A1   Apr. 21, 2005

(51) Int. Cl.
*A47B 96/04* (2006.01)
(52) U.S. Cl. .................. 312/408; 312/313; 211/184; 108/27
(58) Field of Classification Search .......... 312/401, 312/408, 410, 140.4, 313, 351; 211/183, 211/184, 153; 108/27
See application file for complete search history.

(56) References Cited

U.S. PATENT DOCUMENTS 2,828,178 A * 3/1958 Dahlgren .................. 312/408
3,625,371 A * 12/1971 Dill ........................... 211/153
3,877,580 A    4/1975 Hammar
4,023,682 A    5/1977 Niece
4,437,572 A    3/1984 Hoffman
4,610,491 A * 9/1986 Freeman ................... 312/291
4,646,658 A * 3/1987 Lee .......................... 108/143

OTHER PUBLICATIONS

International Search Report for PCT/US02/33553; Isa/210 US; Mailed: Aug. 11, 2003.

* cited by examiner

*Primary Examiner*—James O Hansen
(74) *Attorney, Agent, or Firm*—Harness, Dickey & Pierce, P.L.C.

(57) ABSTRACT

A refrigerator shelving system includes an item retainer for securing items carried on a shelf, a mounting member for releasably securing a shelf to a cabinet of the refrigerator, and a spill tray carried by the shelf. The item retainer is movable between a first position and a second position such that when in the first position, a first side upwardly extends from the shelf and defines a fence and when in the second position the first side is parallel and adjacent to an upper surface of the shelf. The shelf mounting member includes a first portion rotatably interconnected to a lateral side of the shelf and a second portion for selectively engaging a horizontal slot of a cabinet of the refrigerator. The mounting member is rotatable from a first position to a second position to engage the second portion with the horizontal slot. The spill tray includes a main body portion and a plurality of mounting elements. The main body portion is disposed parallel to and substantially adjacent a lower side of the shelf and is positioned completely below the shelf. The plurality of mounting elements releasably engage the shelf.

18 Claims, 7 Drawing Sheets

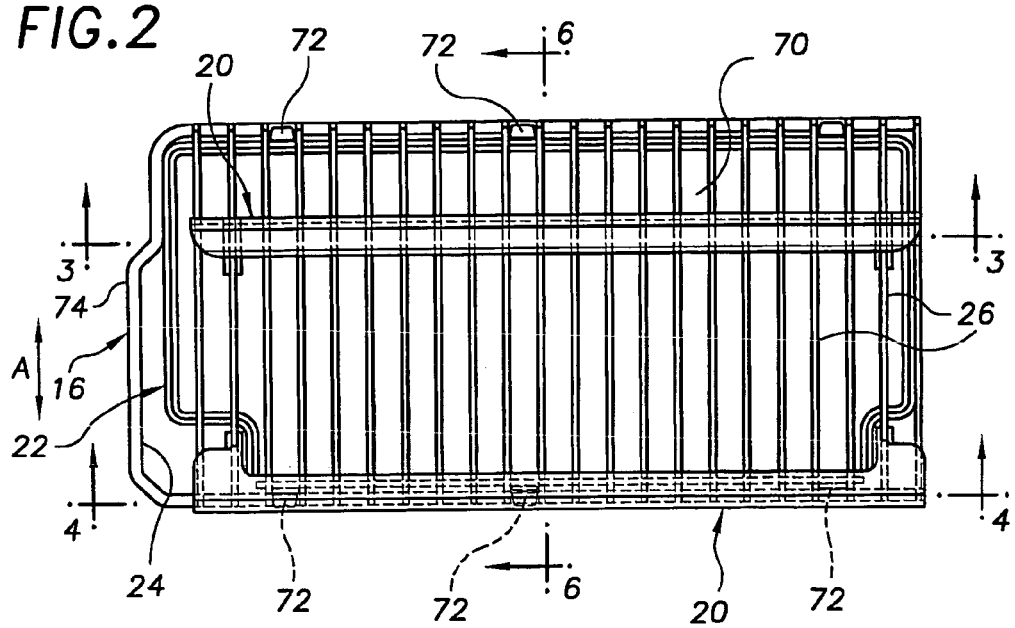
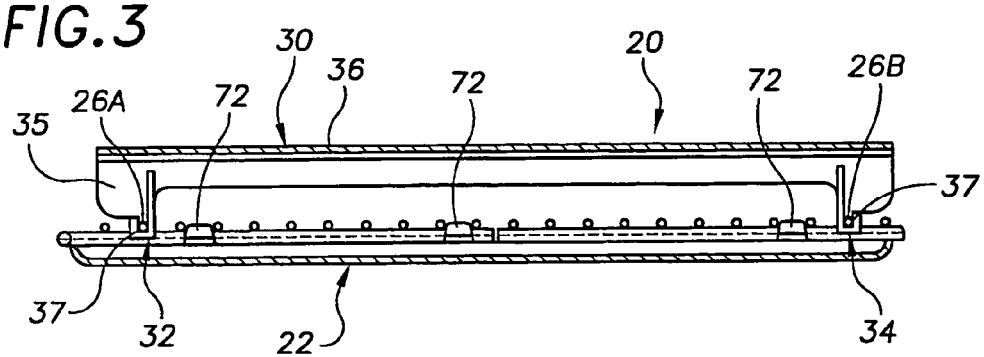
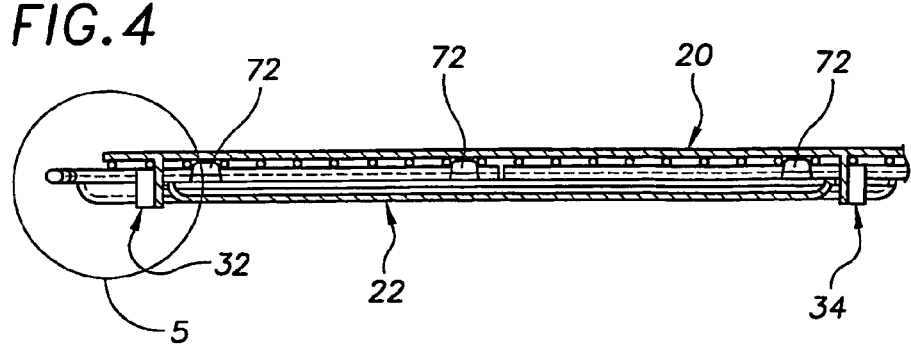

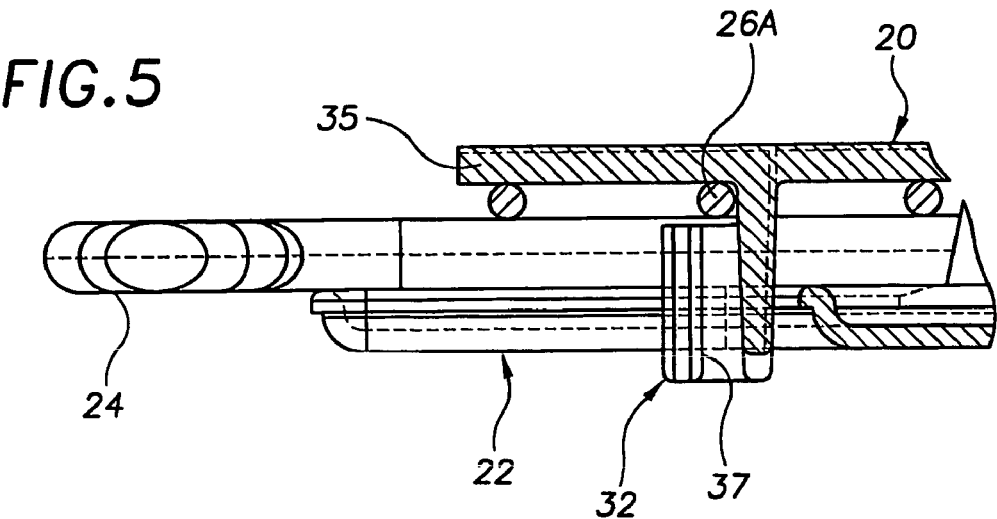
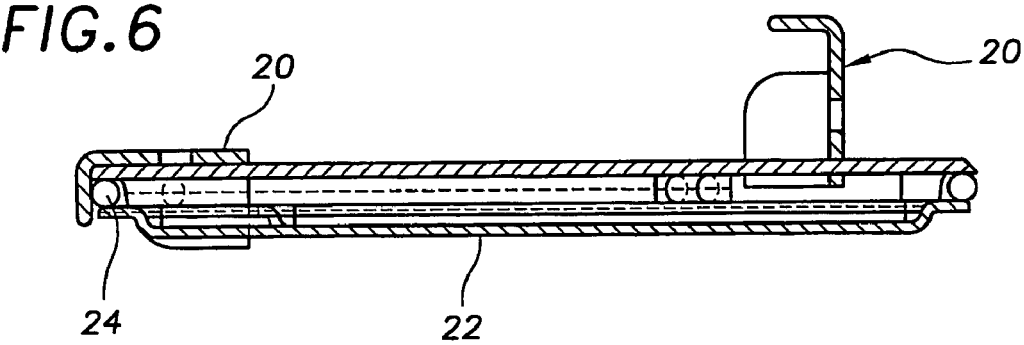
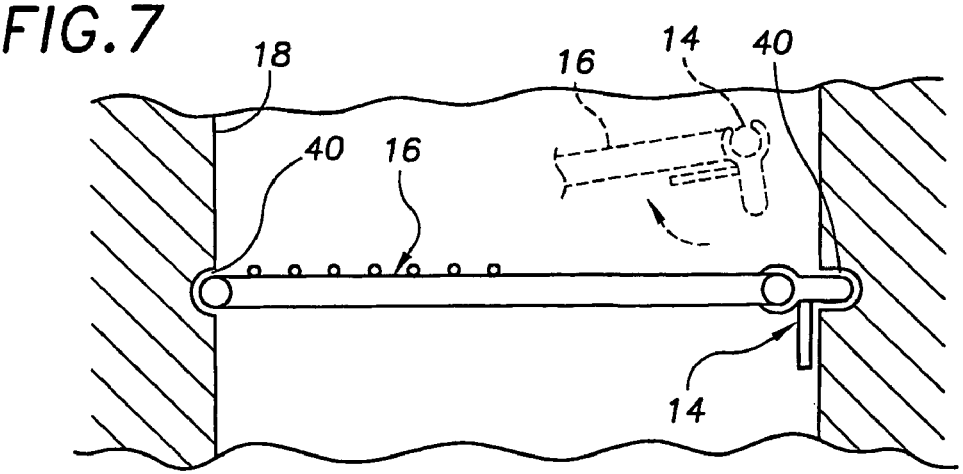

REFRIGERATOR SHELVING SYSTEM

FIELD OF THE INVENTION

The present invention generally relates to refrigerators. More particularly, the present invention relates to a refrigerator shelving system.

BACKGROUND OF THE INVENTION

Vehicles, including but not limited to recreational vehicles ("RVs"), tractor trailers, airplanes, boats, trains, and the like, often incorporate refrigerators for the comfort and convenience of the occupants. Space available for refrigerators on such vehicles is limited and a significant design emphasis has been placed upon maximizing useful refrigerator storage volume. Vehicle refrigerators typically include one or more shelves removably mounted within a cabinet of the refrigerator.

While such conventional refrigerator shelving arrangements have proven to be satisfactory for their intended uses, they are all associated with limitations. For example, the removable shelves of known vehicle refrigerators typically do not quickly and easily mount to the cabinet and often require aesthetically unappealing slots that intersect a forward face of the cabinet. In addition, known shelving arrangements do not adequately secure items within the refrigerator for vehicle movement. Furthermore, removable shelves of known shelving arrangements are not able to adequately contain spills from items stored thereon.

Accordingly, it remains a need in the pertinent art to provide a shelving system for a vehicle refrigerator that overcomes the limitations associated with prior known arrangements, including but not limited to those disadvantages discussed above.

SUMMARY OF THE INVENTION

It is one general object of the present invention to provide a mounting arrangement for removably securing a shelf within a refrigerator cabinet that does not require forwardly opening mounting grooves in the cabinet.

It is a related object of the present invention to provide a mounting member for a removable shelf of a vehicle refrigerator that articulates about a horizontal pivot axis between a first position and a second position for releasably engaging a mounting slot in a cabinet of the refrigerator.

It is another general object of the present invention to provide a retaining member or fence which is carried by a shelf of a refrigerator and is operative for securing items within the refrigerator during vehicle movement.

It is a related object of the present invention to provide a retaining member for a shelf of a vehicle refrigerator is movable between a stored position and a deployed position.

It is another general object of the present invention to provide a spill tray that easily attaches to a shelf of a refrigerator and contains spills from items stored on the shelf.

It is a related object of the present invention to provide a spill tray for a refrigerator shelf which is integrally formed to include an upwardly extending lip extending substantially around its perimeter and a plurality of integrally formed tabs for releasably engaging the shelf.

It is another related object of the present invention to provide a spill bray for a shelf of a refrigerator which does not impede a top surface of the shelf and does not unnecessarily extend below the shelf so as to limit storage space.

In one form, the present invention provides an item retainer for a shelf of a refrigerator. The shelf has a plurality of parallel and spaced apart wires at least partially defining a support surface. The item retainer includes a main body portion, a first mounting portion and a second mounting portion. The main body portion extends in a direction generally perpendicular to the plurality of wires. The first mounting portion extends from the main body portion for engaging a first of the plurality of wires. The second mounting portion extends from the main body portion for engaging a second of the plurality of wires. The item retainer is movable between a first position and a second position such that when in the first position, a first side of the main body portion upwardly extends from the shelf and defines a fence and when in the second position, the first side is parallel and adjacent to the plurality of wires.

In another form, the present invention provides a mounting member for releasably securing a shelf to a cabinet of a refrigerator. The cabinet has a sidewall defining at least one horizontal slot. The mounting member includes a first portion and a second portion. The first portion is rotatably interconnected to a lateral side of the shelf. The second portion selectively engages the at least one horizontal slot. The mounting member is rotatable from a first position to a second position to engage the second portion with the at least one horizontal slot.

In yet another form, the present invention provides a spill tray for a shelf of a refrigerator. The shelf has an upper side and a lower side. The spill tray includes a main body portion and a plurality of mounting elements. The main body portion is generally planar and is disposed parallel to and substantially adjacent the lower side of the shelf. The plurality of mounting elements releasably engage the shelf. The main body portion is positioned completely below the shelf.

Additional advantages and features of the present invention will become apparent from the following description and appended claims, taken in conjunction with the accompanying drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a top view of an upper shelf of the shelving system shown in FIG. 1.

FIG. 3 is a cross-sectional view taken along the line 3-3 of FIG. 2.

FIG. 4 is a cross-sectional view taken along the line 4-4 of FIG. 2.

FIG. 5 is an enlarged view of the detail shown in circle 5 of FIG. 4.

FIG. 6 is a cross-sectional view taken along the line 6-6 of FIG. 2.

FIG. 7 is a simplified view shown particularly in section illustrating engagement of the mounting member with a sidewall of the cabinet.

DETAILED DESCRIPTION OF THE PREFERRED EMBODIMENTS

The following description of the preferred embodiment of the present invention is merely exemplary in nature and is in no way intended to limit the invention, its application, or uses.

Figure 1:
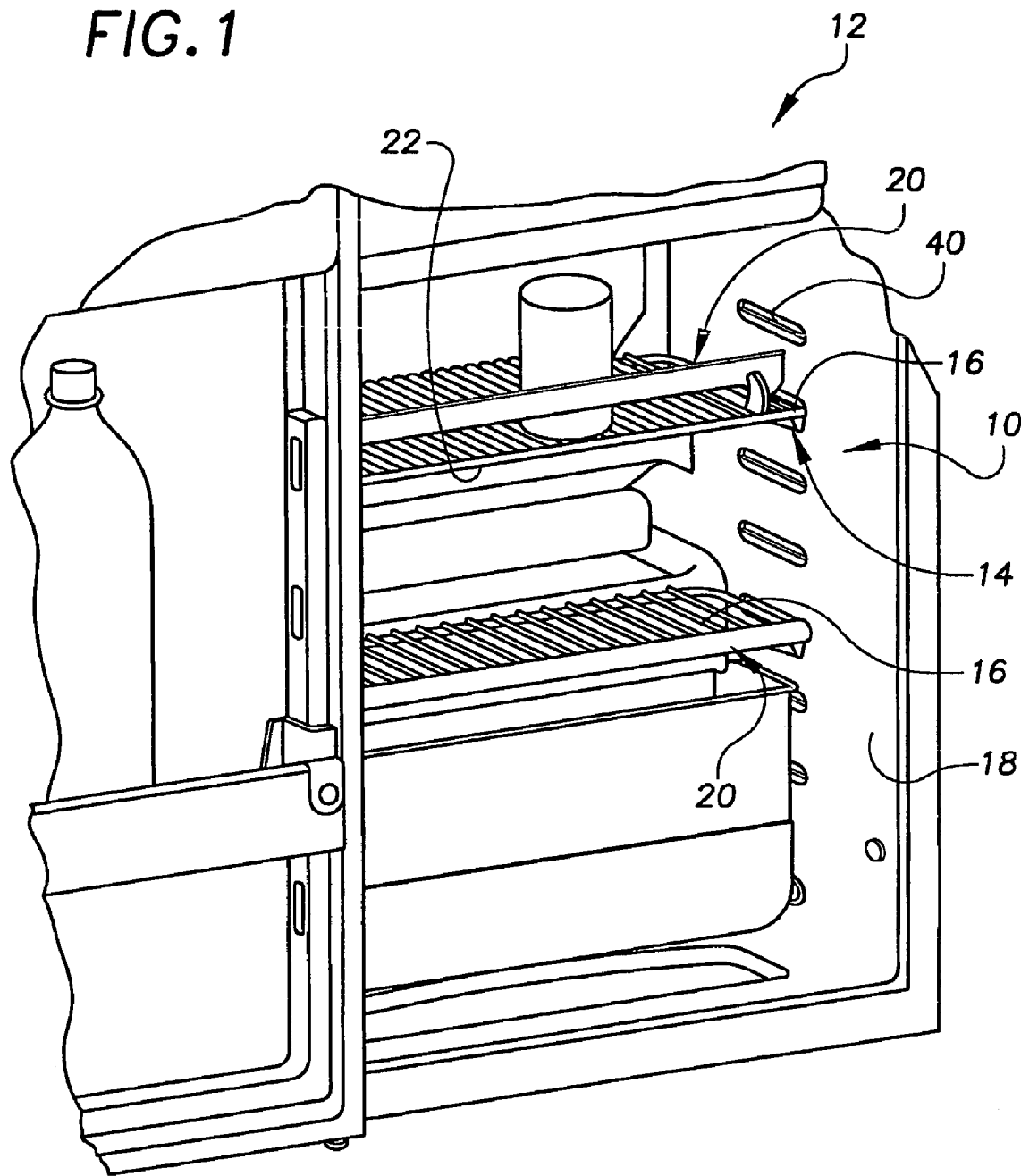
FIG. 1 is a perspective view of a portion of an interior of a refrigerator shown to include a shelving system constructed in accordance with the teachings of a preferred embodiment of the present invention.
Figure 8A:
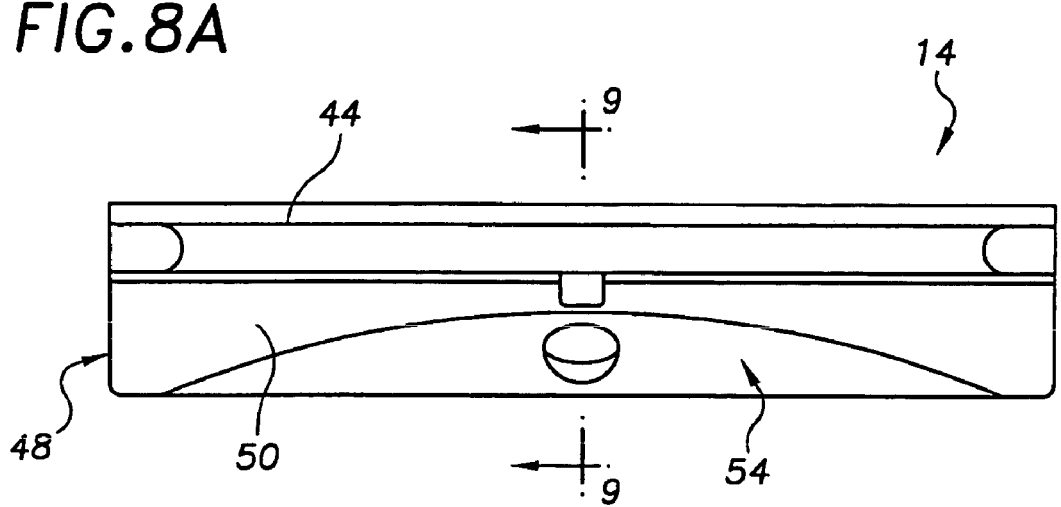
FIG. 8A is a front view of one of the shelf mounting members shown in FIG. 1.
Figure 8B:
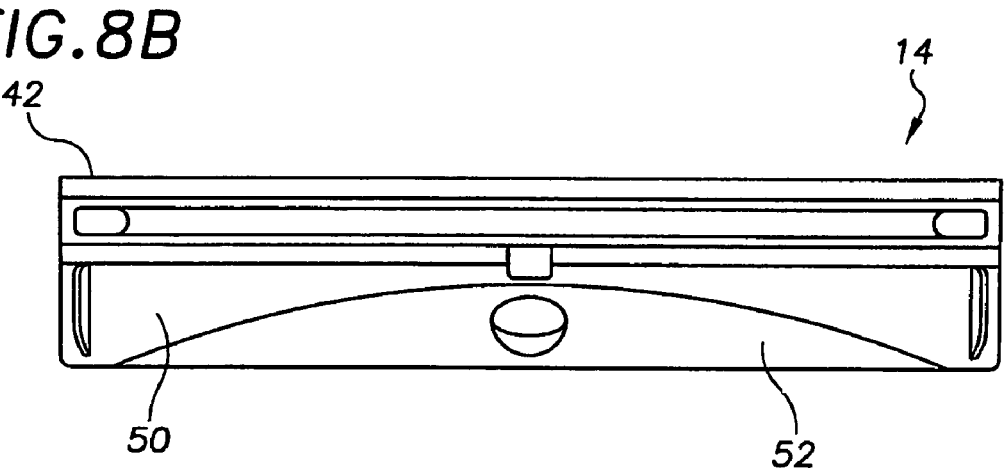
FIG. 8B is a rear view of the shelf mounting member of FIG. 7.
Figure 9:
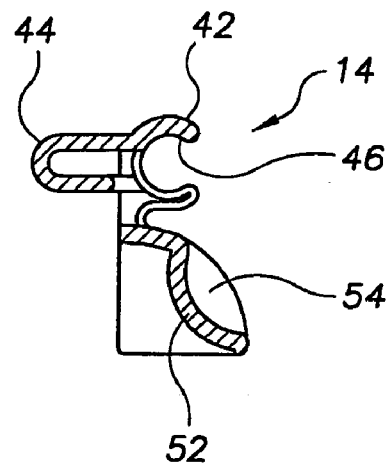
FIG. 9 is a cross-sectional view taken along the line 9-9 of FIG. 7.
Figure 10:
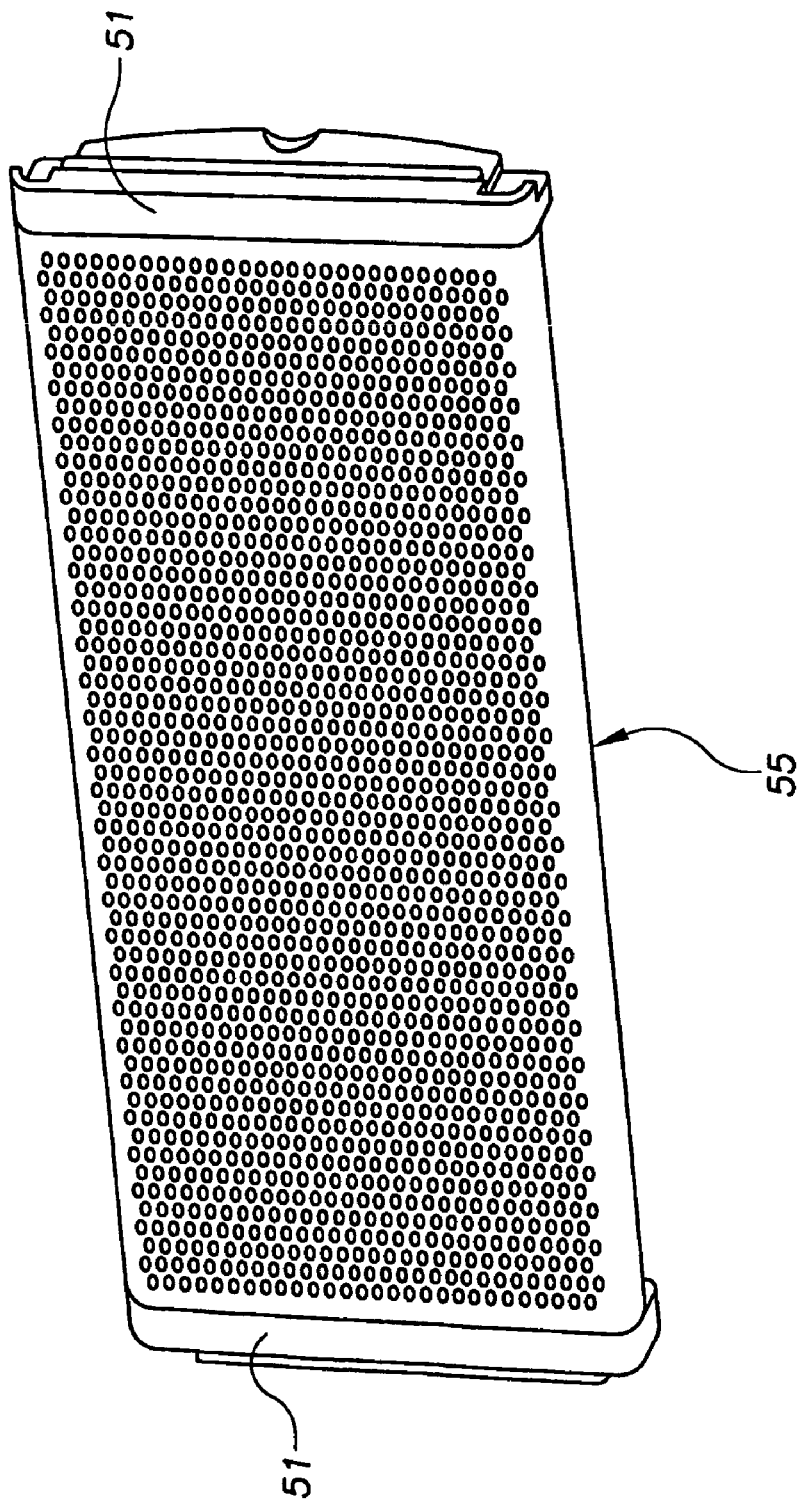
FIG. 10 is a perspective view of an alternative shelf for use with the shelving system of the present invention.
Figure 11:
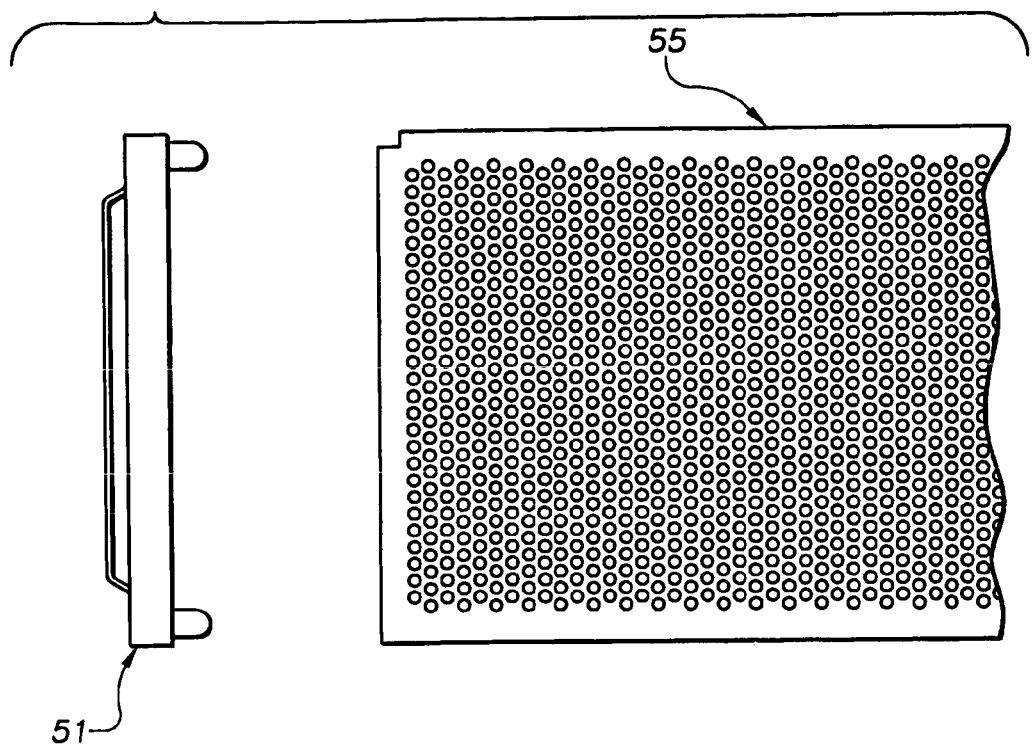
FIG. 11 is a partially exploded view of the shelf of FIG. 10.
Figure 12:
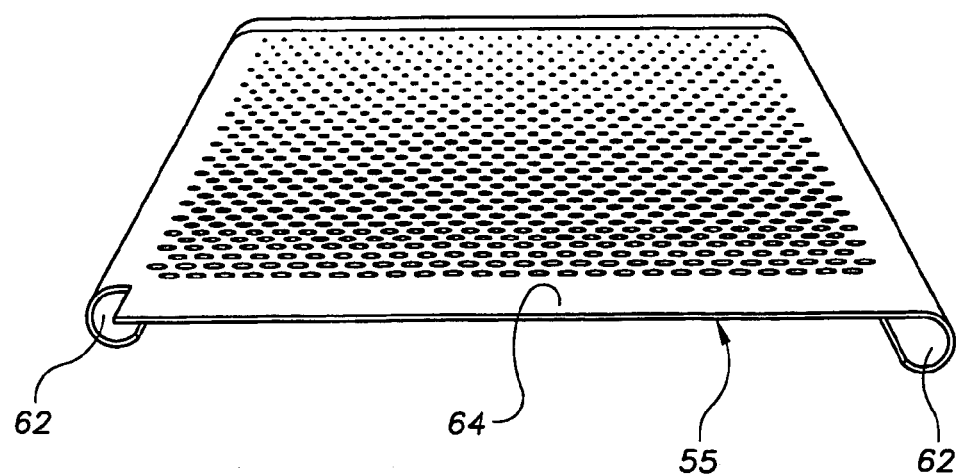
FIG. 12 is a top and side perspective view of the main body portion of the shelf of FIG. 10.
Figure 13:
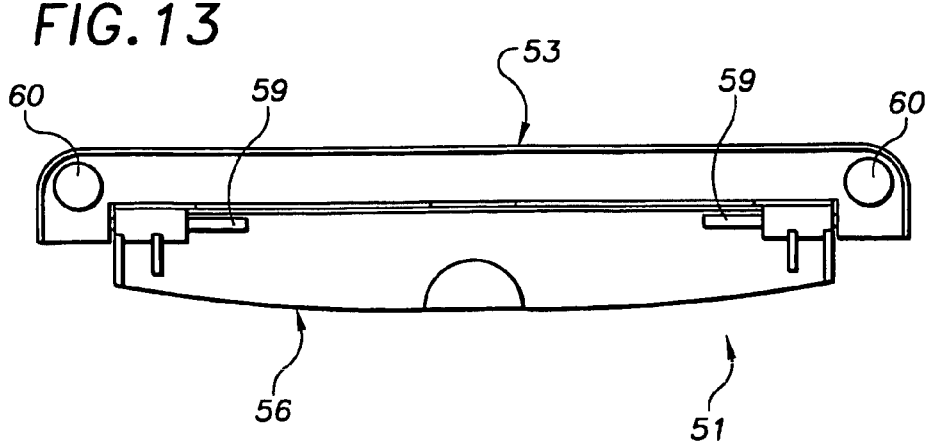
FIG. 13 is an inner side view of one of the mounting ends shown in FIG. 10.
Figure 14:
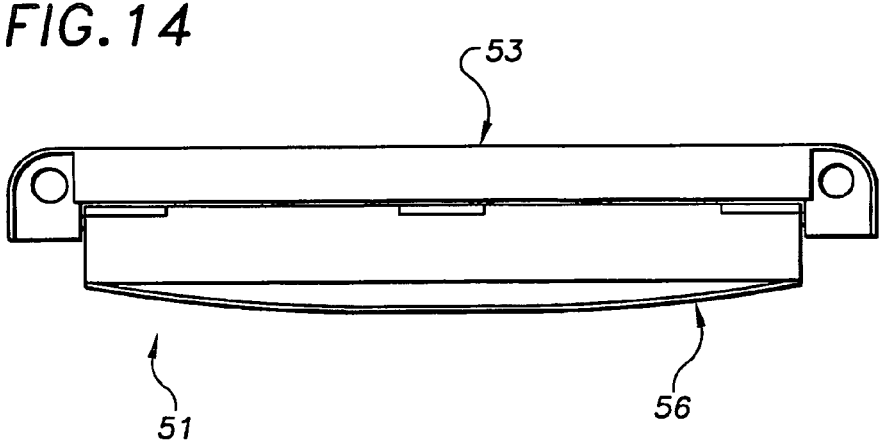
FIG. 14 is an outer side view of the mounting end of FIG. 13, the rotatable portion shown articulated to an engaged position.
Figure 15:
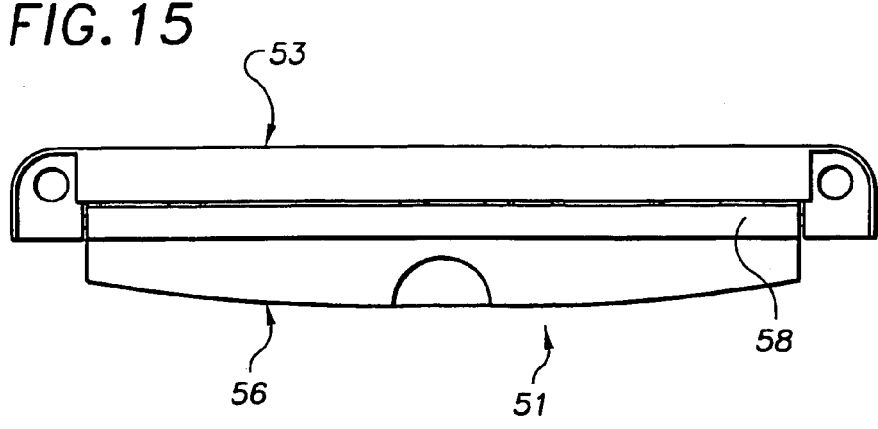
FIG. 15 is an outer side view of the mounting end of FIG. 13, the rotatable portion of the mounting member shown articulated to a non-engaged position.

With initial reference to FIG. 1 of the drawings, a shelving system constructed in accordance with the teachings of a preferred embodiment of the present invention is illustrated and generally identified at reference character 10. As will become apparent below, the subject invention is particularly directed to certain aspects of the shelving system 10. The shelving system 10 is shown incorporated into a particular refrigerator 12. Specifically, the shelving system 10 of the present invention generally includes a plurality of shelf mounting members 14 for releasably securing shelves 16 to a cabinet 18 of the refrigerator 12, an item retainer 20 for securing items carried on a shelf 16, and a spill tray 22 (shown more clearly in FIG. 6) for releasable attachment to a shelf 16. It will be understood that the particular refrigerator 10 shown in FIG. 1 is exemplary and that the teachings of the present invention are not limited thereto.

With continued reference to FIG. 1 and additional reference to FIG. 2, the shelving system 10 of the present invention is shown to include a plurality of shelves 16. In the particular arrangement shown in FIG. 1, the shelving system 10 includes a pair of shelves 16. As perhaps most particularly shown in the top view of FIG. 2, each of the shelves 16 includes a wire frame 24 which defines the four sides of the shelf 16 and a plurality of parallel and spaced apart wires 26 welded or otherwise conventionally attached to the frame 24. The plurality of wires 26 defines an upper or support surface of the shelf 16.

With continued reference to FIGS. 1 and 2 and additional reference to FIGS. 3-6, the item retainer 20 of the present invention will be further described. As will become more apparent below, the item retainer 20 is movable between a stored position and a deployed position. The deployed position is shown, for example, on the upper shelf 16 of FIG. 1 and in the cross-sectional view of FIG. 3. The stored position is shown, for example, on the lower shelf 16 in FIG. 1 and in the cross-sectional view of FIG. 6.

The item retainer 20 is illustrated to generally include a main body portion 30, a first mounting portion 32 and a second mounting portion 34. The main body portion 30 extends in a direction generally perpendicular to the plurality of support wires 26. The first mounting portion 32 extends from the main body portion 30 and engages a first wire 26A (identified specifically in FIG. 3) of the plurality of wires 26. In a similar manner, the second mounting portion 34 extends from the main body portion 30 and engages a second wire 26B (identified specifically in FIG. 3) of the plurality of wires 26.

The main body portion 30 includes a first side 35 and a second side 36. The first and second sides 35 and 36 are oriented generally orthogonal and the first and second mounting portions 32 and 34 extend from the first side 35. When the item retainer 20 is in its deployed position or first position, the main body portion 30 upwardly extends from the shelf 16. When the item retainer 20 is in the stored or second position, the first side 35 is parallel and adjacent to the plurality of support wires 26.

The first and second mounting portions 32 and 34 partially define cylindrical openings 37 for slidably receiving the first and second support wires 26A and 26B, respectively. In the preferred embodiment, the openings 37 receive the respective support wire 26 in a snap-fit relationship. In use, the first and second support wires 26A and 26B are frictionally retained within the first and second mounting portions 32 and 34 in a longitudinal direction (indicated in FIG. 2 by double arrow A). In this manner, the item retainer 20 can be positioned so as to secure items positioned on the shelf 16 between the item retainer 20 and a rear wall of the cabinet 18. The friction which longitudinally retains the position of the item retainer 20 can be overcome by manual urging for selectively positioning the item retainer 20.

When use of the item retainer 20 is not needed, the item retainer 20 is forwardly translated along the first and second support wires 26A and 26B and rotated about a longitudinally extending axis thereof. Explaining further, the item retainer 20 rotates through 90° such that the first side 35 is adjacent to the plurality of support wires 26. In this position, the second side 36 is positioned forwardly of a forward edge of the shelf 16. Further in this position, the first and second support wires 26A and 26B are captured between the first side 35 and the first and second mounting portions 32 and 34, respectively. This relationship is shown most specifically in the cross-sectional view of FIG. 5.

With reference to FIG. 1 and FIGS. 7-9, the mounting members 14 for releasably securing the shelves 16 to the cabinet 18 will be further described. Each of the shelves 16 is associated with at least one mounting member 14. The mounting members 14 is adapted to selectively engage one of a plurality of horizontal slots 40 defined by a sidewall of the cabinet 18. Multiple horizontal slots 40 are defined by each sidewall. In this manner, the shelves 16 can be selectively positioned within the cabinet 18.

The mounting member 14 is shown to include a first portion 42 for rotatable interconnection to a lateral side of one of the shelves 16. The mounting member 14 further include a second portion 44 for selectively engaging one of the horizontal slots 40. The mounting member 14 is rotatable through approximately 90° from a first position (as shown in phantom lines in FIG. 7) to a second position (as shown in solid lines in FIG. 7) to engage the second portion 44 with one of the slots 40 (as shown in FIG. 1).

The first portion 42 is preferably shown to partially define a cylindrical slot 46 for receiving the frame 24 of a shelf 16. The portion of the frame 24 received within the partially cylindrical slot 46 defines a pivot axis about which the mounting member 14 rotates between the first and second positions. Preferably, the frame 24 is received within the slot 46 within a snap-fit relationship.

In the preferred embodiment, the second portion 44 comprises a flange which extends in a direction generally parallel to the slot 40. The flange 44 is shown to extend directly from the first portion 42.

The mounting member 14 further includes a handle 48 having a generally planar portion 50 adapted to be oriented substantially flush with the cabinet sidewall when the mounting member 14 is in the secured or second position. The generally planar portion 50 acts to brace or support the shelf 16 to permit the shelf 16 to accommodate a heavier load. The handle 48 further includes an arcuate portion 52 which defines a concave recess 54. The concave recess 54 provides a surface which is easily manually grasped for rotation of the mounting member 14.

In the preferred embodiment, each shelf 16 is associated with a single mounting member 14. However, it will be understood by those skilled in the art that in certain applications it may be desired to only include a mounting member 14 positioned at both of the lateral sides of the shelf 16. In the preferred embodiment, the opposite lateral side of the shelf 16 directly engages a horizontal slot 40 in the cabinet. In either manner, the mounting members 14 permit the shelf 16 to quickly and easily engage slots 40 in the cabinet sidewall which do not extend to the forward face of the cabinet 18. In this manner, an improved appearance of the cabinet 18 is provided and surfaces which are otherwise difficult to clean are reduced or eliminated.

Turning now to FIGS. 10-15, an alternative mounting member 51 of the present invention will be described. In this particular alternative arrangement, the mounting member 51 includes a first or stationary portion 53 which is secured to an alternate shelf 55 and a second portion 56 rotatably attached to the first portion 53. In a manner similar to the preferred mounting member 14, the second portion 56 defines a flange 58 for selectively engaging one of the horizontal slots 40 of the cabinet 18. The movable member 56 is pivotally attached to the stationary member 53 through a pair of pivot pins 59. The rotatable member 56 is rotatable through approximately 90° from a first position (shown in FIG. 14) to a second position (shown in FIG. 15) for selectively engaging one of the grooves 40.

The stationary member 53 is integrally formed to include a pair of cylindrical extensions 60. The cylindrical extensions 60 engage partially defined cylindrical channels or apertures 62 (shown in FIG. 12) defined by the shelf 55. Explaining further, the shelf 54 is formed from a sheet of metal to include the channels 62. An upper surface 64 of the shelf 54 includes multiple rows of apertures. The apertures reduce material and weight from the shelf 54 and permit airflow to convect therethrough to thereby maintain a nearly uniform low temperature in the interior of the refrigerator.

Returning to FIGS. 2-6, the spill tray 16 of the present invention will be further described. The spill tray 22 includes a generally planar main body portion 70 and a plurality of mounting elements 72. When the spill tray 22 is removably attached to the shelf 16, the main body portion 70 is disposed parallel to and substantially adjacent a lower side of the shelf 16. Further, the main body portion 70 is positioned completely below the shelf 16.

The spill tray 22 further includes a lip 74 that upwardly extends from the main body portion and peripheral surrounds the main body portion 70 for containing spills. The lip 74 is preferably integrally formed with the main body portion 70 through an injection molding procedure and is substantially continuous about the periphery of the main body portion 70.

In the preferred embodiment, the plurality of mounting elements comprise a plurality of integrally formed tabs 72. In the exemplary embodiment illustrated, three tabs 72 extend from a rearward portion of the peripheral lip 74. Similarly, three tabs 72 extend from a forward portion of the peripheral lip 74. The tabs 72 are configured to engage adjacent portions of the frame 24 of the shelf 16. The inherent flexibility of the spill tray 22 permits quick and easy attachment to the frame 24 of the shelf 16.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An item retainer for a shelf of a refrigerator, the shelf having a plurality of parallel and spaced apart wires at least partially defining a support surface, the item retainer comprising:

a main body portion for extending in a directional generally perpendicular to the plurality of wires; and a first mounting portion extending from the main body portion for engaging a first of the plurality of wires;

whereby the item retainer is movable between a first position and a second position such that when in the first position a first side of the main body portion upwardly extends from the shelf and defines a fence and when in the second position the first side is parallel and adjacent to the plurality of wires such that the first of the plurality of wires is captured between the first side of the main body portion and the first mounting portion.

2. The item retainer for a shelf of a refrigerator of claim 1, wherein the main body portion further includes a second side, the second side being generally perpendicular to the first side.

3. The item retainer for a shelf of a refrigerator of claim 2, wherein the plurality of wires forwardly terminate at a forward edge of the shelf and wherein the second side is positioned forward of the forward edge when the item retainer is in the second position.

4. The item retainer for a shelf of a refrigerator of claim 1, wherein the first and second mounting portions slidably receive the first and second wires such that the item retainer is translatable relative to the shelf in a direction parallel to the plurality of wires when the item retainer is in the second position.

5. The item retainer for a shelf of a refrigerator of claim 1, wherein the item retainer rotates about an axis parallel to the plurality of wires between the first and second positions.

6. The item retainer for a shelf of a refrigerator of claim 1, in combination with the refrigerator.

7. The item retainer for a shelf of a refrigerator of claim 1, further comprising a second mounting portion extending from the main body portion for engaging a second of the plurality of wires.

8. An item retainer for a shelf of a refrigerator, the shelf having a plurality of parallel and spaced apart wires at least partially defining a support surface, the item retainer comprising:

a main body portion for extending in a directional generally perpendicular to the plurality of wires; and a first and second mounting portions for connecting the main body portion to the plurality of wires for movement between a first position and a second position such that when in the first position a first side of the main body portion upwardly extends from the shelf and defines a fence and when in the second position the first side is parallel to and in contact with the plurality of wires, the first and second mounting portions defining channels for receiving respective wires of the plurality of wires in a snap-fit relationship in the first position.

9. The item retainer for a shelf of a refrigerator of claim 8, wherein the main body portion further includes a second side, the second side being generally perpendicular to the first side.

10. The item retainer for a shelf of a refrigerator of claim 9, wherein the plurality of wires forwardly terminate at a forward edge of the shelf and wherein the second side is positioned forward of the forward edge when the item retainer is in the second position.

11. The item retainer for a shelf of a refrigerator of claim 9, in combination with the refrigerator.

12. The item retainer for a shelf of a refrigerator of claim 8, wherein the first and second mounting portions slidably receive the first and second wires such that the item retainer is translatable relative to the shelf in a direction parallel to the plurality of wires when the item retainer is in the second position.

13. The item retainer for a shelf of a refrigerator of claim 8, wherein the item retainer rotates about an axis parallel to the plurality of wires between the first and second positions.

14. An item retainer in combination with a shelf of a refrigerator, the shelf having a plurality of parallel and spaced apart wires at least partially defining a support surface, the item retainer comprising:
   a main body portion including a first side and a second side oriented generally orthogonal to one another; and
   first and second mounting portions extending from the first side and adapted to engage respective ones of the plurality of wires in first and second positions such that in the first position the first side of the main body portion upwardly extends from the shelf and defines a fence and when in the second position the first side is substantially parallel and adjacent to the plurality of wires such that at least one of the respective ones of the plurality of wires is captured between the first side of the main body portion and the first mounting portion;
   wherein the first and second mounting portions at least partially define channels for slidably receiving the respective ones of the wires.

15. The item retainer in combination with the shelf of a refrigerator of claim 14, wherein in the second position the respective ones of the wires are captured between the first side of the main body portion and the second mounting portion.

16. The item retainer in combination with a shelf of a refrigerator of claim 14, wherein the plurality of wires forwardly terminate at a forward edge of the shelf and wherein the second side is positioned forward of the forward edge when the item retainer is in the second position.

17. The item retainer in combination with a shelf of a refrigerator of claim 14, wherein the item retainer rotates about an axis parallel to the plurality of wires between the first and second positions.

18. An item retainer for a shelf of a refrigerator, the shelf having a plurality of parallel and spaced apart wires at least partially defining a support surface, the plurality of wires terminate at a forward edge of the shelf, the item retainer comprising:
   a main body portion for extending in a directional generally perpendicular to the plurality of wires, the main body portion includes a first side and a second side, the second side being generally perpendicular to the first side;
   a first mounting portion extending from the main body portion, the first mounting portion partially defining a first cylindrical opening for engaging a first of the plurality of wires in a snap-fit relationship; and
   a second mounting portion extending from the main body portion, the second mounting portion partially defining a second cylindrical opening for engaging a second of the plurality of wires in a snap-fit relationship;
   whereby the item retainer is movable between a first position and a second position such that when in the first position the first side of the main body portion upwardly extends from the shelf and defines a fence and when in the second position the first side is parallel and adjacent to the plurality of wires such that the first of the plurality of wires is in contact with and captured between the first side of the main body portion and the first mounting portion, the second of the plurality of wires is in contact with and captured between the first side of the main body portion and the second mounting portion, and the second side is positioned forward of the forward edge of the shelf;
   wherein the first and second cylindrical openings of the first and second mounting portions, respectively, extend parallel to the plurality of wires when the item retainer is in the first position.

\* \* \* \* \*